(12) United States Patent
Erbes

(10) Patent No.: US 6,490,331 B2
(45) Date of Patent: Dec. 3, 2002

(54) JET PUMP SPRING WEDGE

(75) Inventor: John Geddes Erbes, Mountain View, CA (US)

(73) Assignee: General Electric Company, Schenectady, NY (US)

( * ) Notice: Subject to any disclaimer, the term of this patent is extended or adjusted under 35 U.S.C. 154(b) by 98 days.

(21) Appl. No.: 09/751,226

(22) Filed: Dec. 28, 2000

(65) Prior Publication Data

US 2002/0085662 A1 Jul. 4, 2002

(51) Int. Cl.[7] ............................................. G21C 19/00
(52) U.S. Cl. ..................... 376/372; 376/407; 376/260
(58) Field of Search ................................. 376/372, 407, 376/260, 392, 285; 269/271, 275

(56) References Cited

U.S. PATENT DOCUMENTS

| | | | | |
|---|---|---|---|---|
| 3,779,108 A | * | 12/1973 | Reiter | 24/510 |
| 4,675,149 A | * | 6/1987 | Perry et al. | 376/247 |
| 5,059,214 A | * | 10/1991 | Akopov et al. | 606/207 |
| 5,767,416 A | * | 6/1998 | Conard | 269/271 |
| 5,876,026 A | * | 3/1999 | Chen | 269/138 |
| 5,876,146 A | * | 3/1999 | Deaver et al. | 285/15 |
| 5,978,433 A | | 11/1999 | Erbes et al. | |
| 6,013,088 A | * | 1/2000 | Karavidas | 606/157 |
| 6,052,425 A | | 4/2000 | Erbes et al. | |
| 6,320,923 B2 | * | 11/2001 | Wivagg et al. | 376/407 |

FOREIGN PATENT DOCUMENTS

JP         2001-249196 A    *    9/2001    ................ 376/372

* cited by examiner

Primary Examiner—Michael J. Carone
Assistant Examiner—Daniel Matz
(74) Attorney, Agent, or Firm—Armstrong Teasdale LLP

(57) ABSTRACT

A remotely installable piping support device includes a pair of mating tapered wedge segments extending from lever arms connected with a spiral wound spring. The spring is machined integrally with the left lever arm and has a projecting center square drive hub with an internal mounting thread. The right lever arm has an internal square drive which mates with the drive hub. A bolt engages the drive hub and secures the lever arms together. The spring preload on the wedge acting across the shallow angled wedge surfaces maintains rigid contact between jet pump components and takes up the clearance from wear during operation.

24 Claims, 7 Drawing Sheets

JET PUMP SPRING WEDGE

BACKGROUND OF THE INVENTION

This invention relates generally to nuclear reactors and more particularly, to apparatus for repairing jet pump assemblies within a nuclear reactor pressure vessel.

A reactor pressure vessel (RPV) of a boiling water reactor (BWR) typically has a generally cylindrical shape and is closed at both ends, e.g., by a bottom head and a removable top head. A top guide typically is spaced above a core plate within the RPV. A core shroud, or shroud, typically surrounds the core and is supported by a shroud support structure. Particularly, the shroud has a generally cylindrical shape and surrounds both the core plate and the top guide. There is a space or annulus located between the cylindrical reactor pressure vessel and the cylindrically shaped shroud.

In a BWR, hollow tubular jet pumps positioned within the shroud annulus provide the required reactor core water flow. The upper portion of the jet pump, known as the inlet mixer, is laterally positioned and supported against two opposing rigid contacts within restrainer brackets by a gravity actuated wedge. The restrainer brackets support the inlet mixer by attaching to the adjacent jet pump riser pipe. The purpose of the gravity actuated wedge is to maintain contact between the inlet mixer and the restrainer bracket. The wedge works in cooperation with two set screws which are tack welded to the restrainer bracket to maintain contact with the inlet mixer. The flow of water through the jet pumps typically includes pressure fluctuations that are caused by various sources in the reactor system. The pressure fluctuations may have frequencies close to one or more natural vibration modes of the jet pump piping. The jet pump piping stability depends on the tight fit-up, or contact, of the restrainer brackets and the inlet mixers. Operating thermal gradients, hydraulic loads, and fluctuations in the hydraulic loads can overcome the lateral support provided by the gravity wedge, allowing gaps or clearances to develop at the opposing two fixed contacts or set screws. Particularly, the tack welds can break and the set screws can loosen permitting the jet pump to vibrate within the restrainer bracket. The loss of contact between the inlet mixer and the restrainer bracket can change the jet pump natural frequency to match some excitation frequency in the system, causing vibration of the piping and exerting increased loads which may cause cyclic fatigue cracking and wear of the piping supports, which can result in degradation from wear and fatigue at additional jet pump structural supports.

To overcome this problem, gravity wedge supports have been used at locations where clearances have developed in restrainer bracket contacts. The gravity wedge support employed a sliding wedge and a fixed bracket mount that engaged the jet pump restrainer bracket. These gravity wedges were only applicable to restrainer bracket/inlet mixer gap widths from about 1.0 to 2.0 inches, as space was required for a wedge with sufficient weight to give the desired support load. Another solution which was implemented was to reinforce the welded attachment of the two set screws to the restrainer bracket, then reset the inlet mixer against the set screws when the jet pump is reassembled. However, this procedure causes significant downtime and also requires disassembling the jet pumps.

It would be desirable to provide an apparatus for restoring the tight rigid fit-up provided between the inlet mixer and the adjacent restrainer bracket, replacing the support function of the existing screw type contacts. It would also be desirable to provide an apparatus that can be installed in restrainer bracket/inlet mixer gap widths as small as ¼ inch and provide a continuous adjustment for possible alignment variations between the mixer and diffuser. Further, it would be desirable to provide an apparatus that compensates for after-installation changes in the interface between the mixer and diffuser. Additionally, it would be desirable to provide an apparatus that can be remotely installed by attachment to the existing restrainer bracket without disassembling the inlet mixer.

BRIEF SUMMARY OF THE INVENTION

In one embodiment of the present invention, a remotely installable piping support device couples to the restrainer bracket of a jet pump inlet mixer at a position adjacent an existing screw type contact, typically, a set screw. The remotely installable piping support device includes a left lever arm and a right lever arm. The right lever arm is coupled to the left lever arm. The device also includes a clamp spring which forces the end portions of the lever arms together. The left and right lever arms are movable in relation to one another about the clamp spring as the clamp spring is torsionally deflected. At least one tapered first wedge segment is mounted on the first lever arm, and at least one tapered second wedge segment is mounted on the second lever arm. The tapered second wedge segment slideably engages the tapered first wedge segment to fill any clearances that develop between an inlet mixer and a restrainer bracket. In an exemplary embodiment, the clamp spring is a spiral wound spring integral with one of the lever arms, and the remotely installable piping support device is referred to as a spring wedge.

During installation, the spring wedge is spread apart to an open position utilizing an installation tool. The open spring wedge is positioned around a set screw and the plier tool is removed allowing the spring clamp to cause the first lever arm and second lever arm to close together. The tapered first wedge segment and the tapered second wedge segment slideably engage to fill a gap between the mixer inlet and the restrainer bracket, thus, providing a tight fit-up between the mixer inlet and the restrainer bracket.

The above described spring wedge restores the tight rigid fit-up between the inlet mixer and the adjacent restrainer bracket, enhancing the support function of existing screw type contacts. Additionally the spring wedge is remotely installed by insertion between an existing restrainer bracket and an existing installed inlet mixer. Furthermore, the spring wedge is configured fit in jet pumps which have a restrainer bracket/inlet mixer gap width as small as ¼ inch.

DETAILED DESCRIPTION OF THE INVENTION

Figure 1:
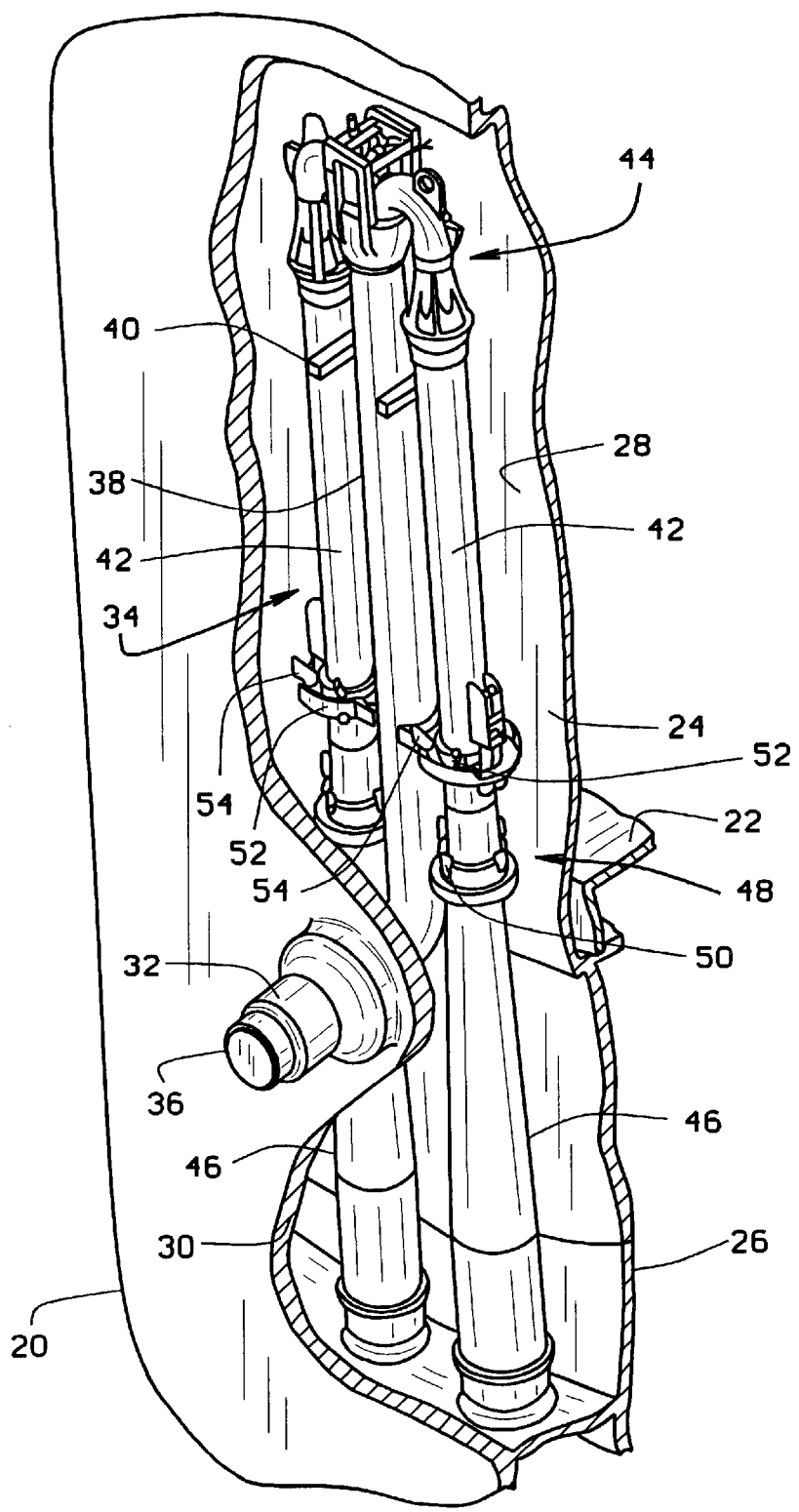
FIG. 1 is a schematic, partial sectional view, with parts cut away, of a reactor pressure vessel for a boiling water nuclear reactor.

FIG. 1 is a schematic, partial sectional view, with parts cut-away, of a reactor pressure vessel (RPV) 20 for a boiling water reactor. RPV 20 has a generally cylindrical shape and is closed at one end by a bottom head (not shown) and at its other end by removable top head (not shown). A top guide (not shown) is spaced above a core plate 22 within RPV 20. A shroud 24 surrounds core plate 22 and is supported by a shroud support structure 26. An annulus 28 is formed between shroud 24 and a side wall 30 of RPV 20.

An inlet nozzle 32 extends through side wall 30 of RPV 20 and is coupled to a jet pump assembly 34. Jet pump assembly 34 includes a thermal sleeve 36 that extends through nozzle 32, a lower elbow (only partially visible in FIG. 1), and a riser pipe 38. Riser pipe 38 extends between and substantially parallel to shroud 24 and RPV side wall 30. A plurality of riser braces 40 stabilize riser pipe 38 within RPV 20. There are a plurality of jet pump assemblies in RPV 20.

Jet pump assembly 34 also includes a plurality of inlet mixers 42 connected to riser pipe 38 by a transition assembly 44. A slip joint 48 couples each inlet mixer 42 to a corresponding diffuser 46. Each diffuser 46 includes four lower guide ears 50 equally spaced around diffuser 46 at slip joint 48. Above each slip joint 48 is a restrainer bracket 52 that holds each inlet mixer 42. Each restrainer bracket 52 includes a pair of set screws (not shown in FIG. 1) to provide a tight fit-up or contact between each inlet mixer 42 and each respective restrainer bracket 52.

Figure 2:
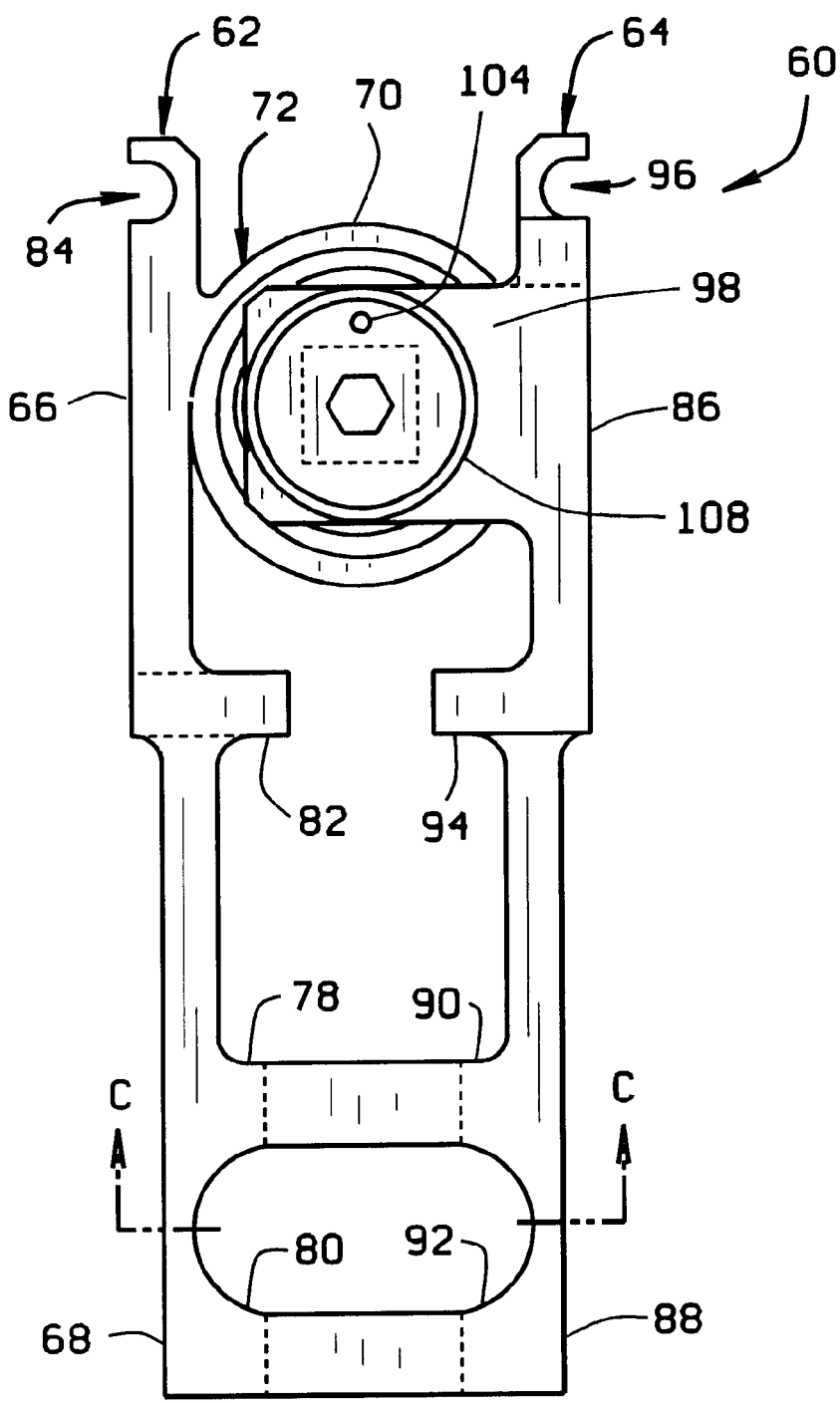
FIG. 2 is a front view of a jet pump spring wedge in accordance with an embodiment of the present invention.
Figure 3:
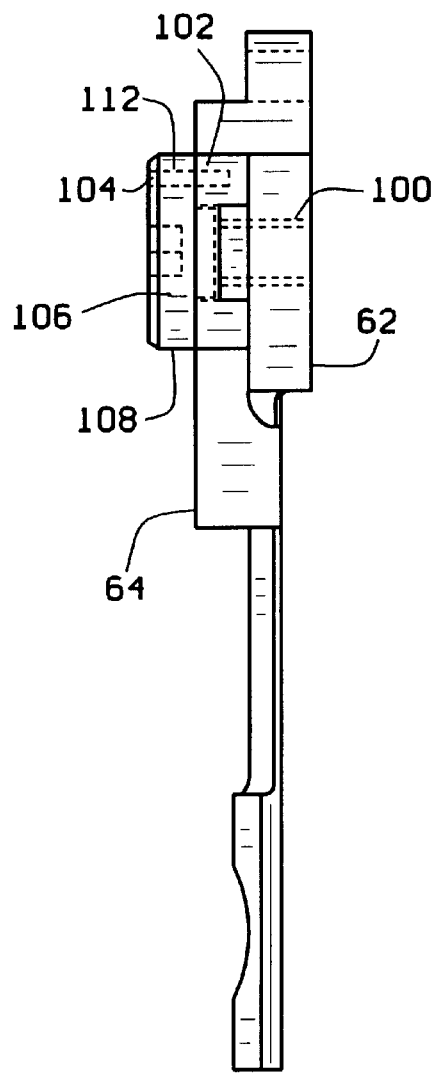
FIG. 3 is a side view of the jet pump spring wedge shown in FIG. 2.
Figure 4:
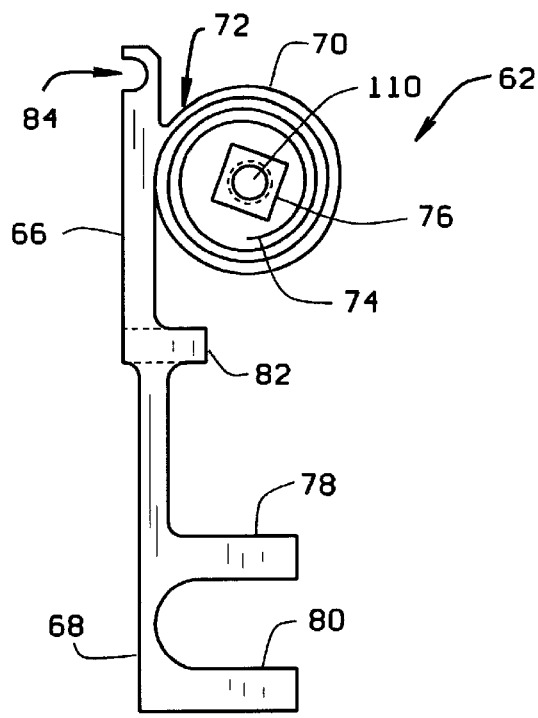
FIG. 4 is a front view of a left lever arm of the spring wedge shown in FIG. 2.
Figure 5:
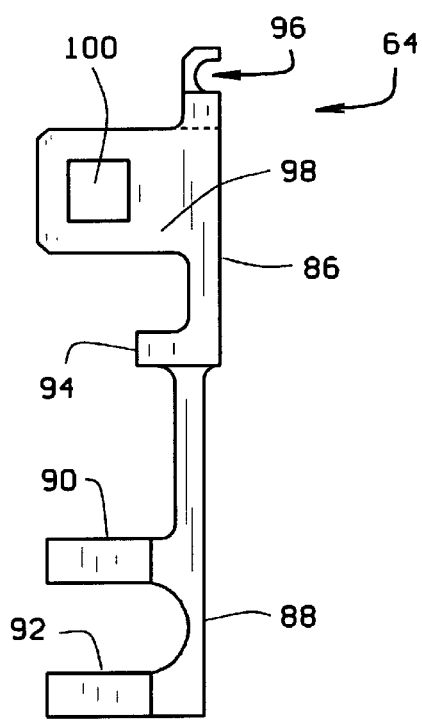
FIG. 5 is a front view of a right lever arm of the spring wedge shown in FIG. 2.

FIG. 2 is a front view and FIG. 3 is a side view of a jet pump spring wedge 60 in accordance with an embodiment of the present invention. Spring wedge 60 includes a left lever arm 62 coupled to a right lever arm 64. FIG. 4 is a front view of left lever arm 62 and FIG. 5 is a front view of right lever arm 64.

Referring to FIGS. 2–5, left lever arm 62 includes a first end portion 66 and a second end portion 68. Left lever arm 62 also includes a spiral clamp spring 70 having a lever end 72 connected to first end portion 66 of left lever arm 62. Spring 70 includes a hub end 74 that includes a projecting square drive hub 76. In an exemplary embodiment, spring 70 is machined integrally with left lever arm 62, i.e., left lever arm 62 is machined from a single piece of material. Two tapered wedge segments 78 and 80 extend from second end portion 68 of left lever arm 62. Wedge segments 78 and 80 are space apart axially along left lever arm 62. A lug 82 extends from first end portion 66 of left lever arm 62. First end portion 66 further includes an installation tool gripping notch 84.

Right lever arm 64 includes a first end portion 86 and a second end portion 88. Two tapered wedge segments 90 and 92 extend from second end portion 88 of right lever arm 64. Wedge segments 90 and 92 are space apart axially along right lever arm 64. A lug 94 extends from first end portion 86 of right lever arm 64. First end portion 86 also includes an installation tool gripping notch 96 and a spring mating portion 98. A square hub opening 100 extends through mating portion 98. Hub opening 100 is sized to receive hub 76. In an alternate embodiment, hub opening 100 and mating hub 76 can be any matching polygonal shape.

Left lever arm 62 and right lever arm are joined together by inserting hub 76 into hub opening 100. A capture bolt 106 having a head 108 threadedly engages a threaded bolt opening 110 in hub 76. In an exemplary embodiment, bolt 106 is locked to mating portion 98 by a locking pin 104 After tightening bolt 106, a locking pin hole 112 is machined through head 108 into mating portion 98. Locking pin hole 112 is sized to receive locking pin 104 in a tight fit. Locking pin 104 is inserted through locking pin opening 112 in bolt head 108 and into mating portion 98 of right lever arm 64. The open end of hole 112 is then peened partly closed to capture locking pin 104.

Square drive hub 76 is machined at about a 20 degree angle of rotation with respect to the longitudinal axis of left lever arm 62. As a result, when left and right lever arms 62 and 64 are assembled in their normally aligned position, spiral spring 70 is torsionally deflected to provide about 12 pounds of preload force to drive the mating wedge segments 78, 80, 90 and 92 into engagement together. In an alternative embodiment, drive hub 76 is machined at between about an 8 to 40 degree angle of rotation with respect to the longitudinal axis of left lever arm 62 to provide between about 5 to 25 pounds of preload force.

Figure 6:
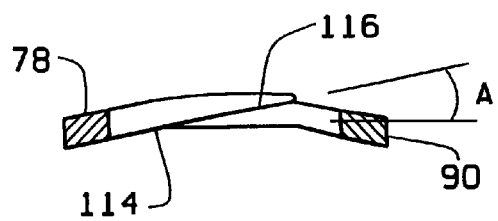
FIG. 6 is a cross-sectional view of the spring wedge shown in FIG. 2 along line C—C.

FIG. 6 is a bottom cross-sectional view of spring wedge 60 (shown in FIG. 2) along line C—C showing tapered wedge segment 78 slideably engaging mating tapered wedge segment 90. Wedge segment 78 and wedge segment 90 are machined with about a 10 degree slope angle A between sliding surface 114 of wedge segment 78 and sliding surface 116 of wedge segment 90. In an alternate embodiment, slope angle A is between five and twenty degrees. In another alternative embodiment, wedge angle A is greater than twenty degrees. In a further alternative embodiment, wedge angle A is less than five degrees. Mating wedge segments 80 and 92 are configured similar to mating wedge segments 78 and 90 described above.

Figure 7:
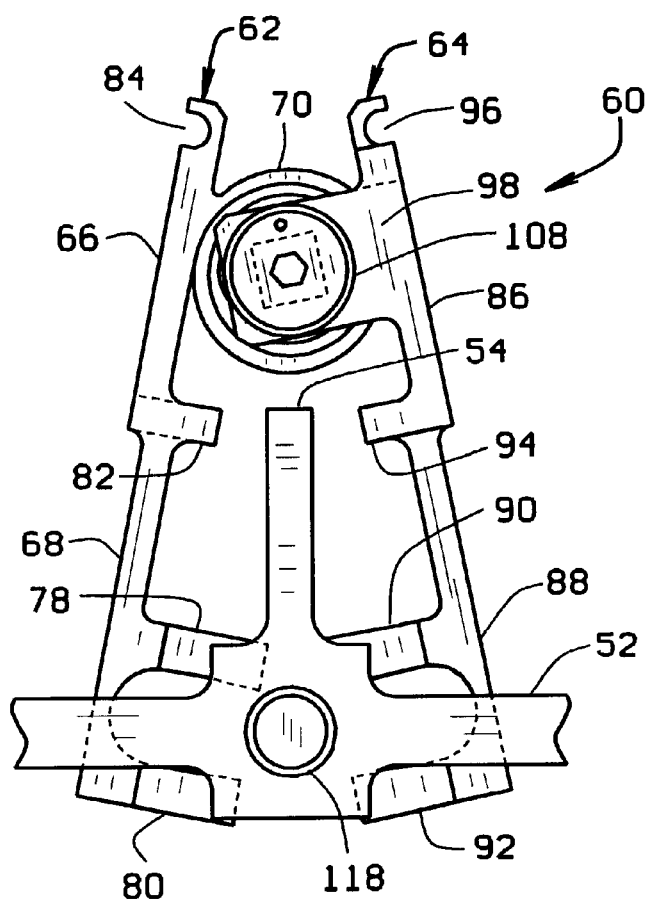
FIG. 7 is a front view of the spring wedge shown in FIG. 2 in an open position engaging a restrainer bracket.
Figure 8:
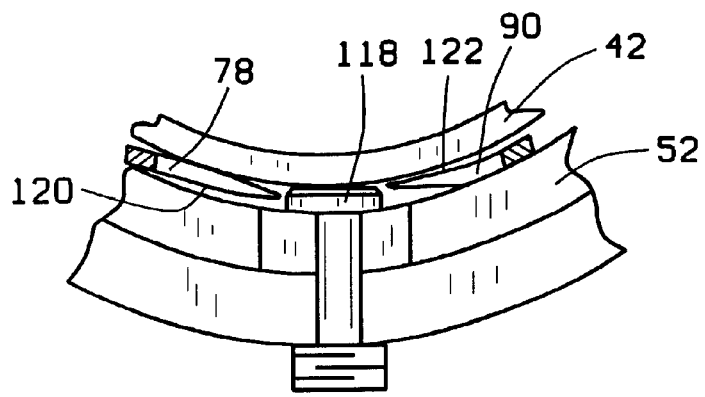
FIG. 8 is a bottom cross-sectional view of the spring wedge shown in FIG. 7.

FIG. 7 is a front view and FIG. 8 is a bottom cross-sectional view of spring wedge 60 spread apart in an open position to permit the placement of spring wedge 60 between inlet mixer 42 and restrainer bracket 52, around a set screw 118. During installation, a plier type installation tool (not shown) engages notches 84 and 96 of right and left lever arms 62 and 64 to pivotably move right and left lever arms to an open position with mating wedge segments 78, 80, 90, and 92 disengaged permitting spring wedge 60 to be positioned between restrainer bracket 52 and inlet mixer 42 fitting around set screw 118. The installation tool is then released allowing spring 70 to preload second end portions 68 and 88 together to engage mating wedge segments 78, 80, 90 and 92.

Figure 9:
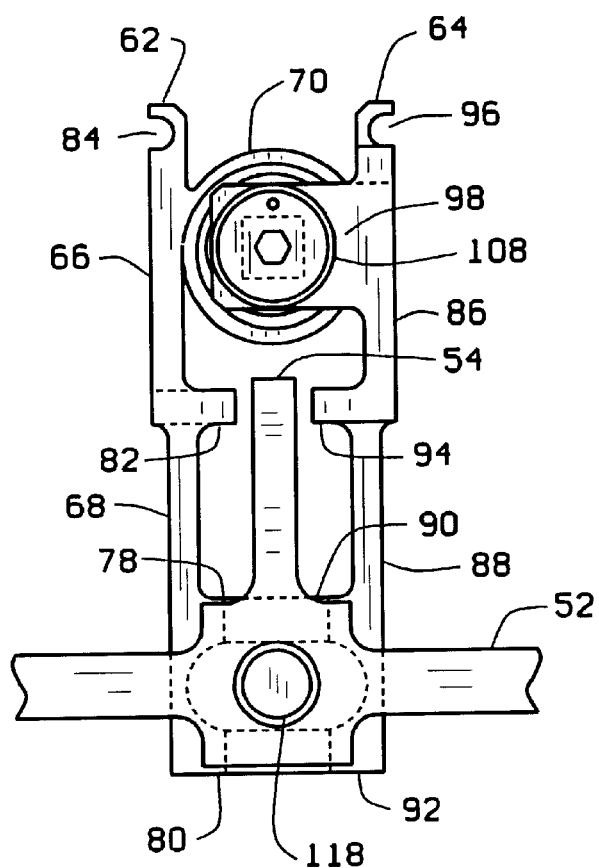
FIG. 9 is a front view of the spring wedge shown in FIG. 2 in a closed positioned around a set screw of a retainer bracket.
Figure 10:
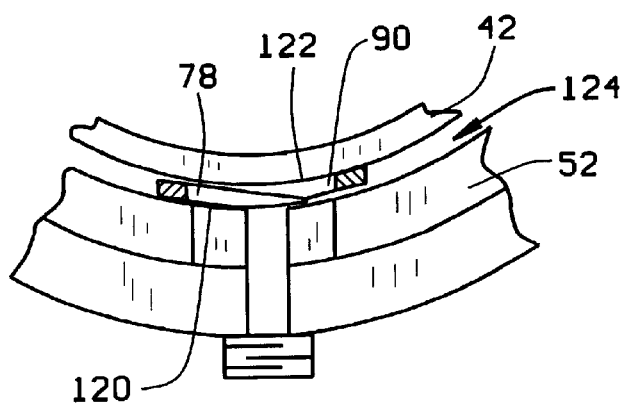
FIG. 10 is a bottom cross-sectional view of the spring wedge shown in FIG. 9.
Figure 11:
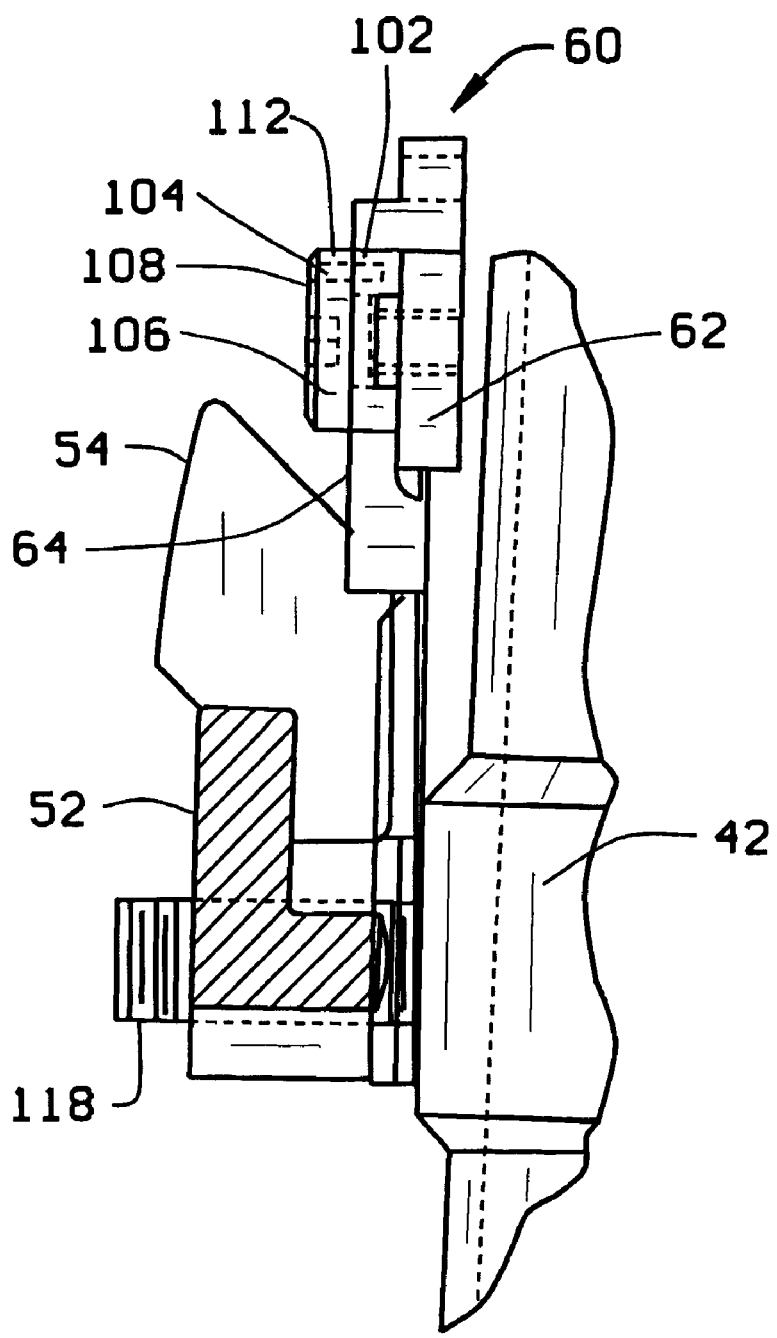
FIG. 11 is side view of the spring wedge shown in FIG. 2 installed on an inlet mixer and restrainer bracket

FIG. 9 is a front view, FIG. 10 is a bottom cross-sectional view, and FIG. 11 is a side view of spring wedge 60 after installation on inlet mixer 42 around set screw 118. Tapered wedge segments 78 and 80 of left lever arm 62 slideably engage tapered wedge segments 90 and 92 of right lever arm, with the preload of spring 70, providing a tight fit-up between inlet mixer 42 and restrainer bracket 52. Projecting lugs 82 and 94 straddle guide ear 54 to maintain spring wedge 60 in a substantially vertical orientation. Referring to FIG. 10, tapered wedge segment 78 includes a contact surface 120 in addition to wedge sliding surface 114. Contact surface 120 contacts restrainer bracket 52. Tapered wedge segment 90 includes a contact surface 122 in addition to wedge sliding surface 116. Contact surface 122 contacts inlet mixer 42. The preload of spring 70 induces a wedging action to force contact between surfaces 120 and 122, contacting restrainer bracket 52 and inlet mixer 42 respectively as wedge segments 78 and 90 slide along sliding surfaces 114 and 116 to a closed position.

During installation, spring wedge 60 is spread utilizing the plier type installation tool (not shown), as explained above. The installation tool is removed after spring wedge 60 is positioned around set screw 118 and between inlet mixer 42 and restrainer bracket 52. Because spring 70 is torsionally deflected twenty degrees during assembly of spring wedge 60, an approximate twelve pound force preloads second end portions 68 and 88 of left and right lever arms 62 and 64 together. Particularly, tapered wedge segments 78 and 80 of left lever arm 62 and tapered wedge segments 90 and 92 of right lever arm 64 are moved together and slideably engage to fill a gap 124 between mixer inlet 42 and restrainer bracket 52, thereby, providing a tight fit-up between mixer inlet 42 and restrainer bracket 52. During operation of jet pump assembly 34, any wear that increases gap 124 will cause tapered wedge segments 78 and 80 and tapered wedge segments 90 and 92 to further slideably engage and fill the increased gap 124. A tight fit-up is maintained by the preload of spring 70 even though wear during operation of jet pump 34 increases gap 124 between mixer inlet 42 and restrainer bracket 52.

The above described spring wedge apparatus 60 restores the tight rigid fit-up between inlet mixer 42 and adjacent restrainer bracket 52, enhancing the support function of existing screw type contacts such as set screw 118. Additionally apparatus 60 is remotely installed by insertion between an existing restrainer bracket 52 and an existing inlet mixer 42 without disassembly of jet pump 34.

While the invention has been described in terms of various specific embodiments, those skilled in the art will recognize that the invention can be practiced with modification within the spirit and scope of the claims.

What is claimed is:

1. A piping support device comprising:
   a first lever arm comprising a first end portion and a second end portion;
   a second lever arm comprising a first end portion and a second end portion, said second lever arm coupled to said first lever arm;
   at least one tapered first wedge segment extending from said second end portion of said first lever arm;
   at least one tapered second wedge segment extending from said second end portion of said second lever arm, each said tapered second wedge segment slideably engagable with a corresponding tapered first wedge segment; and
   a clamp spring mounted on said first end portion of said first lever arm.

2. A device in accordance with claim 1 wherein said clamp spring is integrally formed with first lever arm from a single piece of material.

3. A device in accordance with claim 2 wherein said clamp spring comprises:
   a spiral wound spring comprising a lever end and a hub end, said lever end attached to said first end portion of said first lever arm; and
   a drive hub connected to said hub end.

4. A device in accordance with claim 3 wherein said drive hub comprises a polygonal shape and is machined at between an 8 to 40 degree angle of rotation with respect to a longitudinal axis of said first lever arm.

5. A device in accordance with claim 2 wherein said spiral wound spring exerts a preload force of approximately five to twenty pounds between said second end portion of said first lever arm and said second end portion of said second lever arm.

6. A device in accordance with claim 1 wherein each said tapered second wedge segment comprises a wedge angle between five and twenty degrees.

7. A device in accordance with claim 6 wherein each said tapered second wedge segment comprises a wedge angle of 10 degrees.

8. A device in accordance with claim 1 further comprising
   at least two tapered first wedge segments extending from said second end portion of said first lever arm; and
   at least two tapered second wedge segments extending from said second end portion of said second lever arm, each said tapered second wedge segment slideably engagable with a corresponding tapered first wedge segment.

9. A device in accordance with claim 1 further comprising:
   a first projecting lug extending from said first end portion of said first lever; and
   a second projecting lug extending from said first end portion of said second lever arm.

10. A method of restoring a tight rigid fit between an inlet mixer and an adjacent restrainer bracket, in a boiling water nuclear reactor pressure vessel, utilizing a piping support device, the restrainer bracket coupled to a jet pump riser pipe, the piping support device comprising a first lever arm, a second lever arm coupled to the first lever arm, at least one tapered first wedge segment extending from the first lever arm, and at least one tapered second wedge segment extending from the second lever arm, each tapered second wedge segment slideably engagable with a corresponding tapered first wedge segment, said method comprising the steps of:
    spreading apart the first lever and the second lever arm;
    positioning the piping support device between the restrainer bracket and the inlet mixer with the spread lever arms around a set screw of the restrainer bracket; and
    releasing the spread lever arms so that each second wedge segment slidably engages a corresponding first wedge segment.

11. A method in accordance with claim 10 wherein the first lever arm further comprises a spring clamp.

12. A method in accordance with claim 11 wherein the spring clamp comprises a spiral wound spring.

13. A method in accordance with claim 10 wherein the first lever arm comprises at least two tapered first wedge segments and the second lever arm comprises at least two tapered second wedge segments.

14. A method in accordance with claim 10 wherein the first lever arm comprises a first projecting lug, and the second lever arm comprises a second projecting lug.

15. A jet pump for a boiling water nuclear reactor, said jet pump comprising:
    an inlet mixer;
    a diffuser coupled to said inlet mixer by a slip joint;
    a restrainer bracket comprising at least one set screw engagable with said inlet mixer; and a piping support device, said piping support device comprising:
- a first lever arm comprising a first end portion and a second end portion;
- a second lever arm comprising a first end portion and a second end portion, said second lever arm coupled to said first lever arm;
- at least one tapered first wedge segment extending from said second end portion of said first lever arm; and
- at least one tapered second wedge segment extending from said second end portion of said second lever arm, each said tapered second wedge segment slideably engagable with a corresponding tapered first wedge segment.

16. A jet pump in accordance with claim 15 wherein said piping support device further comprises a clamp spring mounted on said first end portion of said first lever arm.

17. A jet pump in accordance with claim 13 wherein said first end portion of said first lever arm further comprises an integral spring clamp.

18. A jet pump in accordance with claim 17 wherein said spring clamp comprises:
- a spiral spring comprising a lever end and a hub end, said lever end attached to said first end portion of said first lever arm; and
- a drive hub connected to said hub end.

19. A jet pump in accordance with claim 18 wherein said drive hub comprises a polygonal shape and is machined at between an 8 to 40 degree angle of rotation with respect to a longitudinal axis of said first lever arm.

20. A jet pump in accordance with claim 17 wherein said spiral spring exerts a preload force of approximately five to twenty pounds between said second end portion of said first lever arm and said second end portion of said second lever arm.

21. A jet pump in accordance with claim 15 wherein each said tapered second wedge segment comprises a wedge angle between five and twenty degrees.

22. A jet pump in accordance with claim 21 wherein each said tapered second wedge segment comprises a wedge angle of 10 degrees.

23. A jet pump in accordance with claim 15 wherein said piping support device further comprises:
- at least two tapered first wedge segments extending from said second end portion of said first lever arm; and
- at least two tapered second wedge segment extending from said second end portion of said second lever arm, each said tapered second wedge segment slideably engagable with a corresponding tapered first wedge segment.

24. A jet pump in accordance with claim 13 wherein said piping support device further comprises:
- a first projecting lug extending from said first end portion of said first lever; and
- a second projecting lug extending from said first end portion of said second lever arm.

* * * * *

UNITED STATES PATENT AND TRADEMARK OFFICE
CERTIFICATE OF CORRECTION

PATENT NO.     : 6,490,331 B2
DATED          : December 3, 2002
INVENTOR(S)    : John Geddes Erbes It is certified that error appears in the above-identified patent and that said Letters Patent is hereby corrected as shown below:

Column 7,
Line 18, delete "13" and insert therefor -- 15 --.

Column 8,
Line 23, delete "13" and insert therefor -- 15 --.

Signed and Sealed this

Twelfth Day of October, 2004

JON W. DUDAS
*Director of the United States Patent and Trademark Office*